United States Patent [19]

Hagihara

[11] Patent Number: 4,472,273
[45] Date of Patent: Sep. 18, 1984

[54] FILTER LIFT SYSTEM

[76] Inventor: Tadashi Hagihara, Fujimi Bldg., 2nd Floor, Tokyo, Japan

[21] Appl. No.: 366,850

[22] Filed: Apr. 9, 1982

Related U.S. Application Data

[63] Continuation-in-part of Ser. No. 961,977, Nov. 20, 1978, abandoned.

[51] Int. Cl.³ .............................................. B01D 35/02
[52] U.S. Cl. .................................... 210/159; 210/162; 210/413
[58] Field of Search ................ 210/154, 159, 162, 407, 210/413

[56] References Cited

U.S. PATENT DOCUMENTS

| | | | |
|---|---|---|---|
| 2,634,863 | 4/1953 | Hauer | 210/162 |
| 3,347,382 | 10/1967 | Quast | 210/159 |
| 3,591,006 | 7/1971 | Daferner et al. | 210/159 |
| 3,615,012 | 10/1971 | Verbandt | 210/159 |
| 3,909,411 | 9/1975 | Angele et al. | 210/159 |
| 4,184,957 | 1/1980 | Botsch | 210/155 |
| 4,265,750 | 5/1981 | Meunier | 210/159 |
| 4,353,797 | 10/1982 | Verbandt | 210/159 |

FOREIGN PATENT DOCUMENTS

| | | | |
|---|---|---|---|
| 2625979 | 12/1977 | Fed. Rep. of Germany | 210/159 |
| 16059 | 7/1908 | United Kingdom | 210/159 |

*Primary Examiner*—Robert H. Spitzer
*Attorney, Agent, or Firm*—Eugene F. Malin

[57] ABSTRACT

An improved filter lift system including generally vertical filtering member with a plurality of generally vertical elements or rearward sloping elements, bars or strips of material positioned across a fluid stream, and teeth lift mechanism with teeth positioned between the filtering elements for lifting debris positioned forward, adjacent and upstream to the filter lift system. The debris removal means includes the teeth that lift and dump the debris and claws that clean and pull debris off the teeth. In phase one, the teeth lifting mechansim moves the teeth upward through a rearward sloping lower portion of the face of the filtering element to prevent compacting of debris below the teeth. The teeth lifting mechanism moves the teeth upward. In a second phase, the distal upstream portion of the teeth project out from between the filtering elements on the upstream side to pick up debris during the debris removal portion of the cycle of operation. During the third phase, the teeth are movable upward and forward to clean the teeth and filtering elements. This is accomplished by the shape of the teeth and the shape of the filtering elements, and the relative movement therebetween. Then the teeth are moved upwardly and rearwardly during the fourth phase to remove debris from the teeth. Movable claws can be used to scrape debris off the teeth for discharge to a collection point. Thereafter, the teeth are positioned behind the front face, that is, downstream of the forward face of the single row of filtering elements and between the single row of filtering elements, and are moved downwardly during the fifth phase to the forward start position for repeated cyclic movement.

6 Claims, 20 Drawing Figures

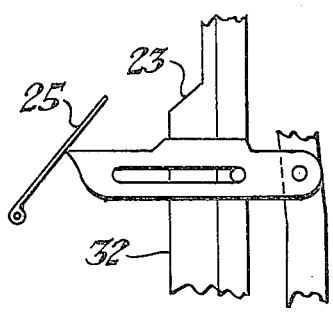
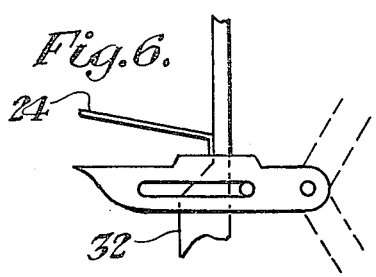
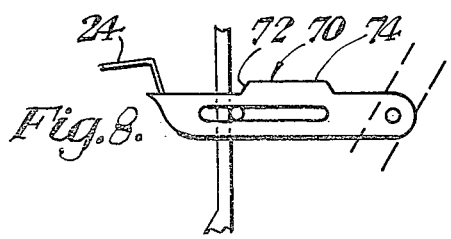
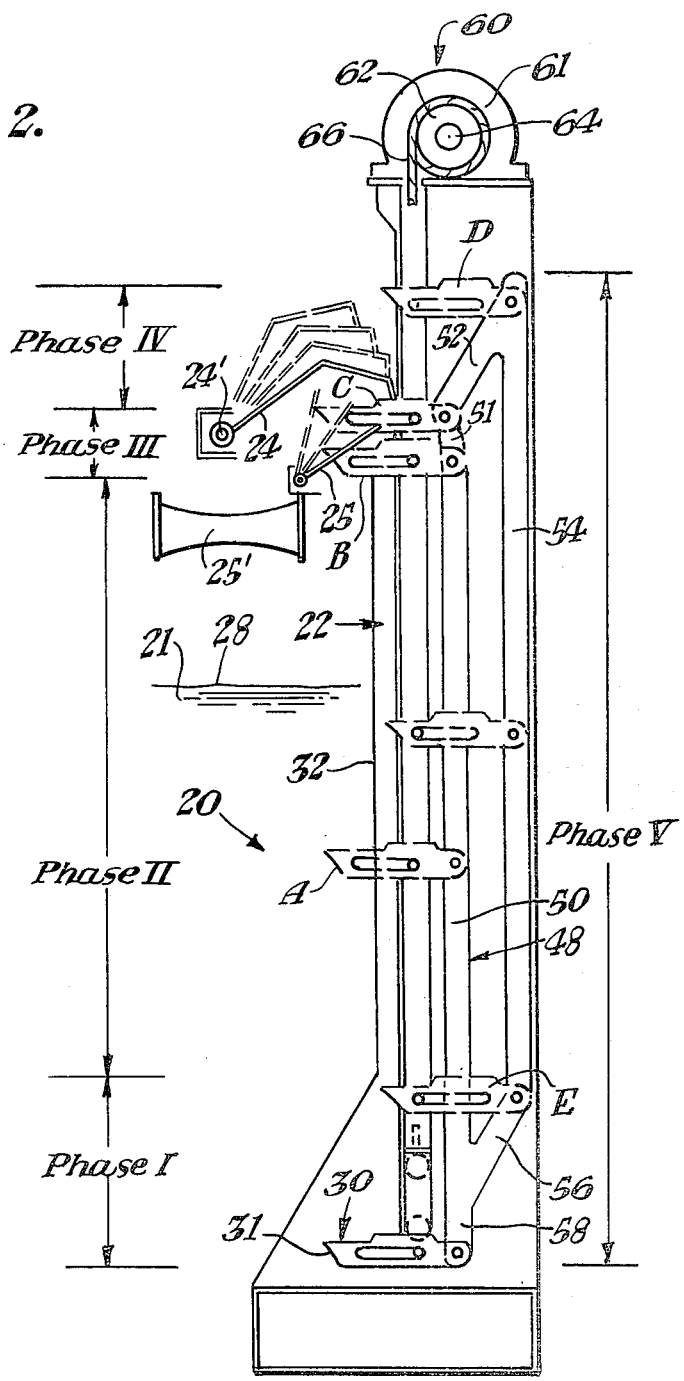
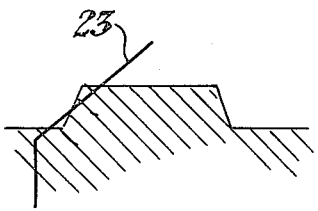

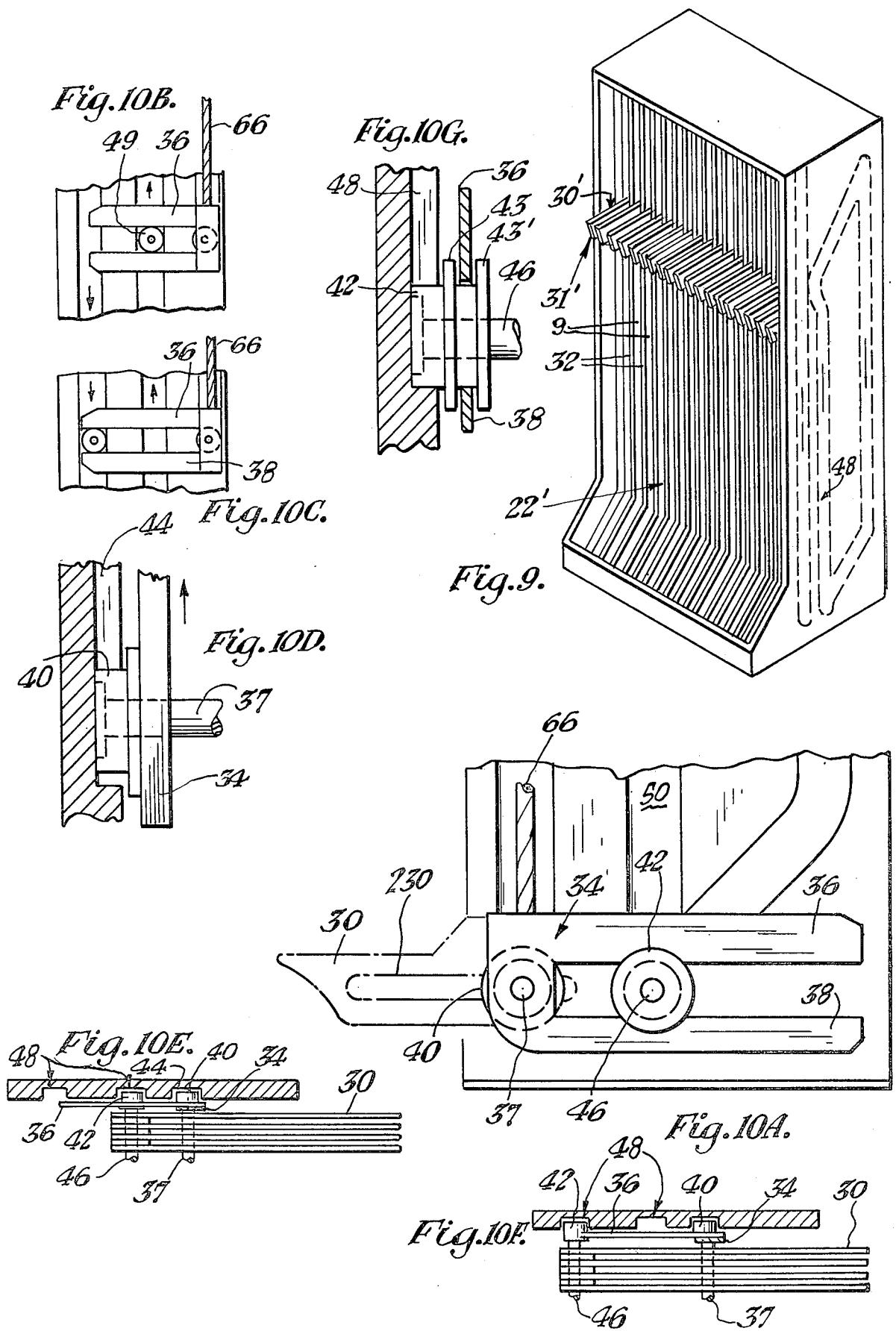

U.S. Patent  Sep. 18, 1984  Sheet 3 of 3  4,472,273
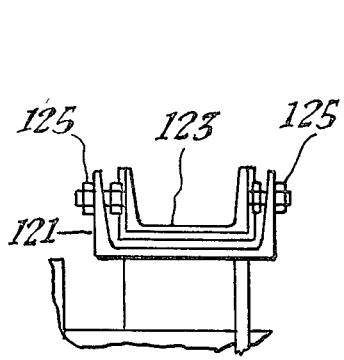
Fig. 14.
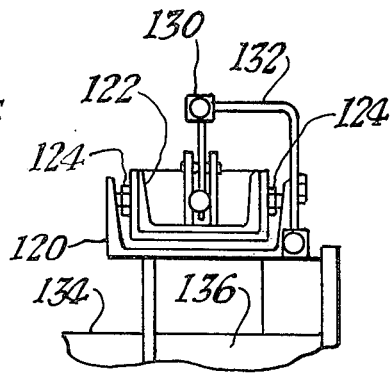
Fig. 13.
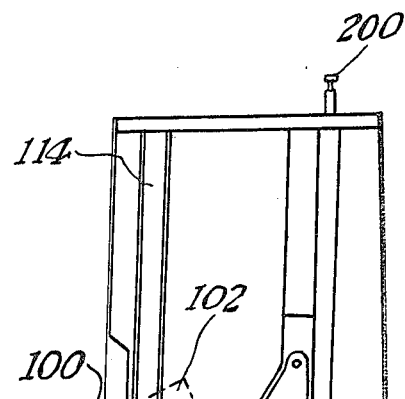
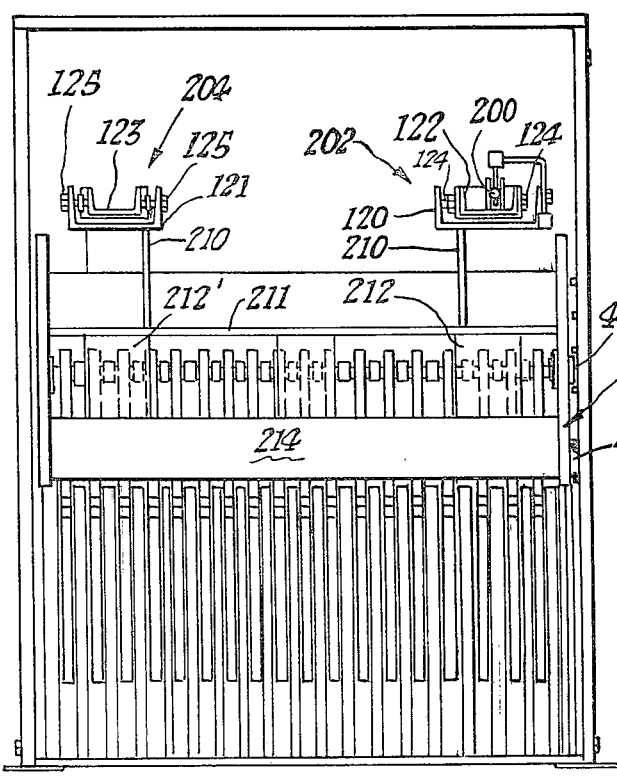
Fig. 12.
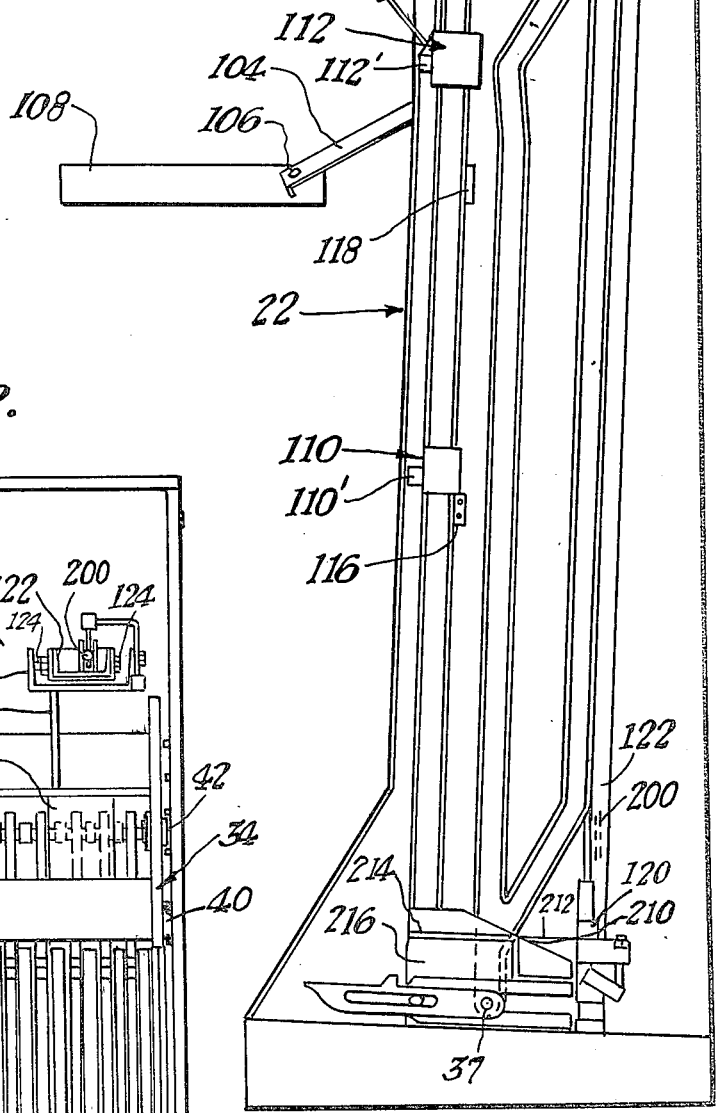
Fig. 11.

FILTER LIFT SYSTEM

This is a continuation-in-part of patent application Ser. No. 961,977 filed Nov. 20, 1978, entitled Filter Lift System now abandoned.

BACKGROUND OF THE INVENTION

In the past, many types of debris removal lift means have been designed for filter bars. Prior art filters utilized debris removal lift means that were disengaged rearward from the filter bars, or held the distal end of the teeth forward of the front face of the filters during the return or downward portion of the cyclic movement, or required additional sets of filter bars. In the past lifting mechanisms were positioned upstream of the filter bars in some designs and downstream of the filter bars in others. Such lift mechanisms often jammed debris between the teeth and the filter bars, or jammed the teeth and the filter bars. When the debris or the teeth are jammed in the filter bar the filter system is inoperative until external means are used to clear the jam.

The lifting mechanisms also govern the minimal usable dimensions between each vertical filter. This dimension is relatively large due to the normal disengagement, in prior art, of the teeth from between the filter bars on the return half of the cyclic movement of the lift mechanism from its uppermost position to its lowermost start position, and to periodic failure of the teeth to properly align with the respective openings between the filter bars.

SUMMARY OF THE INVENTION

An improved filter lift system including a filtering member consisting of a plurality of generally closely spaced generally vertical filtering elements, or bars, or strips of material positioned across a fluid stream, an improved lifting mechanism positioned down stream of the filtering elements with movable teeth means, debris removal means and movable spacer means. The moveable teeth lifting means are movable upward through a rearward sloping lower portion of the filtering elements in the first phase of operation. The teeth lifting means are movable from a position below the surface of the stream to a position above the surface of the stream during the second phase of operation. The distal end of the teeth project outward from between the filter members and upstream of the face of the filter members which are normally connected to the floor of the stream bed or to a base frame of the filter system. The spacing between the vertical bars, or strips of the filtering elements may be as small as one millimeter in this filter lift system. The strips may be very thin and may also be held in tension.

The lifting mechanism includes a plurality of generally horizontally oriented teeth members for movement in a vertically oriented cyclic path. The distal ends of the teeth are always positioned between the vertical elements such as bars, or strips, thus preventing misalignment of the teeth and the vertical elements, and requiring only one filtering member. Phase one of the cycle of operation begins with the teeth move upwardly from a start position below the surface of the stream. The teeth are projected out through the filtering members to an upstream position during phase one of the upward cycle. Phase one takes place below the surface of the stream. The teeth are thereafter maintained in the same relative position as they leave phase one for movement upward and through the surface of the stream during phase two. During this portion of the cycle of operation, debris is lifted upward and out of the stream. The teeth, after moving to this uppermost portion of phase two, are then moved forward of the front face of the filtering elements and upward to automatically push the collected debris away from the face of the filtering elements and forward of the inner surfaces between the filtering elements during phase three. Thereafter during phase four the teeth are moved upward and inward or rearward of the front face of the filtering elements to dump debris off the teeth. Moveable claws can be arranged to scrape debris off the teeth during phase four. Then, in phase five, the teeth are returned to their original lower position while holding the teeth between the filtering elements downstream of the front face of the filtering elements. The cycle of operation is thereafter repeated.

The teeth include a cleaning nodule portion that moves outward from between the filtering elements during phase three of the cycle of operation to aid in cleaning the filtering elements. The filtering elements are cut back rearward at an upper position to provide an indented portion to aid the teeth in automatically cleaning the filtering elements during phase three of the operating cycle. Adjacent the top of the phase three, when the distal portion of the teeth are moved further forward or upstream of the filtering elements to project further out, the nodule on the teeth moves out past the upstream or forward sloping entrance of the indented portion of the filtering elements.

Movable spacers may also be positioned at various heights between the filtering elements to prevent vibration and to aid in maintaining proper spacing between the filtering elements. The lifting mechanism and teeth move the spacers upward during phase two, three and four and returns the spacers to their rest position during phase five.

A claw device or retractor scraper can be included to aid in cleaning debris off of the teeth as they move teeth rearward and upward in phase four. The scraper is movable about a pivot point. The end of the scraper is positioned against the filtering elements during phases one, two and three. As the teeth move outward and upward in phase three, the scraper engages a rear portion of the top of the teeth. During phase four the scraper moves across the top of the teeth at a speed greater than the speed of movement of the teeth rearward to stroke and scrape and clean off the top of the teeth.

The teeth lifting mechansim may be driven by a reciprocal mechanism, rack and pinion, or by an endless belt or other means. In all embodiments, the teeth lifting mechanism includes a plurality of teeth that are moved upwardly and forward or upstream or outwardly from between the bars, or strips adjacent the lowermost position of the filtering member. Thereafter, the teeth are moved upward in the upstream position as the teeth pass through the surface of the stream to a position above the surface. As the teeth are moved upward and forward of the filtering member and thereafter upward and rearward at the top of the stroke, the debris on the teeth and between the filtering elements and the material scraped off each tooth is dropped from the teeth onto a moveable guide plate to convey the debris into an accumulator or disposal container. The teeth are thereafter moved downwardly to the start position below the water surface where the cycle may be repeated. The cycle of movement is designed to prevent jamming of debris between the elements while maintaining proper orientation between the teeth and the filtering elements. The path of the teeth are controlled in order to automatically clean the filtering member and teeth as well as dumping debris into a debris accumulator or removeable trash container.

As the debris is carried up the upstream face of the filtering member and filtering elements on top of the teeth, the debris and teeth may come in contact with the moveable guide plate connected to a container. The guide plate projects upward from a hinge connection at the top rear edge of the container. The distal edge of the guide plate is in removable contact with the filter elements. The distal edge of the guide plate gives way to the upward movement of the debris and teeth. The upward movement of the guide plate allows the debris and teeth to move past the movable guide plate. After the teeth and debris pass the movable guide plate, the guide plate will automatically drop back downwardly and rearwardly to its original sloping position with the higher distal edge of the guide plate in engagement with the filter bars. When the teeth begin moving inward during phase four, the debris automatically falls from the teeth onto the sloping guide plate surface and thereafter moves into the container. The guide plate is positioned at an angle so that the falling debris will slide down the guide plate into the container. A bucket in the container may then be moved periodically or other conveyor means may be employed to transfer the material to a remote dumping area.

It is an object of this invention to provide for the removal system of trash and debris from a filter having generally parallel-vertical bars, or strips wherein the space between individual filtering members may be as small as one millimeter.

It is an object of this invention to provide a filter lift system with movable lift teeth that are always positioned between the general vertical bars or strips but rearward of the upstream face during downward movement of the movable lift teeth.

It is an object of this invention to provide automatic teeth cleaning systems.

It is an object of this invention to provide a lifting system preventing debris from jamming the system mechanism.

It is another object of this invention to provide an inexpensive lifting mechanism.

It is an additional object of this invention to provide a lift system that can be combined with any type of bucket dump system.

In accordance with these and other objects which will be apparent hereinafter, the instant invention will now be described with particular reference to the accompanying drawings.

BRIEF DESCRIPTION OF THE DRAWINGS

In the drawings:

FIG. 1 is an illustration of the filter lift system showing one filter member and one tooth in the start position Phase I with phantom view of the teeth in pluraltiy of positions.

FIG. 2 is an enlarged illustration of a tooth in one position as it moves upstream in Phase III.

FIG. 3 is an enlarged illustration of a portion of the tooth of the same shape in a second position as it moves upstream in Phase III.

FIG. 4 is an enlarged illustration of a portion of the tooth of another shape in a third position as it moves upstream in Phase III.

FIG. 5 is an enlarged illustration of a portion of the tooth of still another shape in a fourth position as it moves upstream in Phase III.

FIG. 6 is an illustration of the tooth at another position moving rearward into Phase IV.

FIG. 7 is an illustration of the tooth at an additional position moving rearward in Phase IV.

FIG. 8 is an illustration of the tooth at still another position moving rearward in Phase IV.

FIG. 9 is an isometric front view of the filter showing the filter lift system.

FIG. 10A is a partial right side view of an embodiment of the teeth lift mechanism in FIG. 1 at the start position in Phase I.

FIG. 10B is a partial left side view of the teeth lift mechanism positioned mid way through the lifting cycle in Phase II.

FIG. 10C is a partial left side view with the teeth lift mechanism in Phase V returning to a start position.

FIG. 10D is a partial cross-sectional view of FIG. 10A showing the wheel in a track.

FIG. 11 is another side view of another embodiment of a filter lift system as shown in FIG. 1 showing the element spacers and stabilizing means.

FIG. 12 is a partial top view of FIG. 11.

FIG. 13 is an enlarged view of a portion of FIG. 12.

FIG. 14 is another enlarged view of a portion of FIG. 12.

DESCRIPTION OF THE PREFERRED EMBODIMENTS

Referring now to the filter lift system 20 shown in FIGS. 1 and 9, the filter lift system includes a plurality of generally vertical filtering elements 9 in a filtering member 22 with a plurality of bars or strips of material positioned across a fluid stream 21 as shown at 22' in FIG. 9. The teeth lift mechanism 60 in FIG. 1 is generally positioned rearward or downstream of the filtering member 22 for lifting debris positioned upstream in the fluid stream 21. The lift mechanism is adjacent to the filtering member. A debris removal means 24 and slide 25 are connected to the filter lift system. The debris is lifted up the face of the filtering member that may be preferrably at an angle between 90° and 80° sloping downstream. The debris is lifted to a position above the surface 28 of the stream 21. The debris is lifted past the movable slide 25 as shown in FIGS. 1 and 2. The slide 25 moves as shown in phantom in FIG. 1. The teeth lifting mechanism includes a plurality of teeth 30 and 30' as shown in FIGS. 1 and 9 respectively. The teeth are always positioned between the filter members during phases I, II, III, IV and V.

During the upward movement or sweep of the teeth as shown in FIG. 1 the distal end portion 31 of the teeth project out through the filtering member to an upstream position during phase II as shown in phantom at A. The teeth as shown at 30 and A move up during phases I and II of the lifting portion of the cycle of operation to pick up debris in the fluid or water 21. The teeth 30 move outward and upward as shown in FIG. 1 at B and C and as shown in FIGS. 2, 3, 4 and 5 during phase III to aid in cleaning the debris off the filter member 22 and teeth 30. The filter member 22 and the plurality of filter elements are cut back at 23 as shown in FIGS. 1, 2, 3, 4, 5, 6 and 7 to further aid in cleaning or releasing debris from the teeth 30 and filter members 22. One debris removal means 24 is hinged at 24' and first engages the top of the teeth as shown in FIG. 6. As the teeth 30 move up and in during phase IV from the position in FIG. 6, to FIG. 7, and to FIG. 8 the distal end of the debris removal means 24 aids in moving debris off the teeth and scraping the debris off of the teeth. The removal means 24 moves outward by being moved up by the movement of the teeth as shown in phantom in FIG. 1. The teeth are movable inwardly as shown in FIGS. 1, 7 and 8 during Phase III to dump debris from the teeth 30 onto the slide 25 to move the debris into a container (not shown) or a conveyor 25' shown in FIG. 1. Thereafter, the teeth are moved downward from position D during Phase V with the distal ends 31 of teeth 30 positioned at or just behind the upstream face 32 of the filter members but never disengaging from between the filtering elements of the filtering member 22 during the return portion of the cycle of operation during Phase V.

The teeth lifting mechanism includes a drive means such as motor 61 having a winch drum 62 on motor shaft 64 for pulling cable 66 up in order to lift the teeth during Phases I, II, III and IV and to allow the teeth to move down during Phase V. The cable operated by the drive means is connected to member 34 and horizontal frame members 36 and 38 shown in FIGS. 10A through 10C. Cable 66 is connected by way of frame member 34 in FIG. 10A to teeth support bar 37. Cam wheels 40 are mounted on the distal ends of teeth support bar 37 and ride in vertical groove 44 see FIGS. 10E and 10F. Like means may be provided to connect a second cable to the opposite frame member a mirror image of frame member 34 as shown in FIG. 10A a left side view and FIGS. 10B, 10C, 10D, 10E and 10F a right side view.

The horizontal members 36 and 38 support the rear of the teeth 30. The rear teeth movable support shaft 46, has cam wheel 42 on one end that rides in cam groove 48 and between horizontal members 36 and 38. Cam groove 48 as shown in FIG. 1 includes a vertical upward groove 50, an upward outward groove 51, an inward groove portion 52, a vertical downward groove 54, and an outward groove portion 56. FIGS. 10E and 10F are shown with wheel 42 in two different positions. Wheel shafts 37 and 46 support the teeth 30. Groove portion 58 is a bottoming out portion. Shaft 37 is fixed in frame member 34, see FIG. 10D. Wheel 42 on movable shaft 46 in FIG. 10G includes flanges 43 and 43' that ride around horizontal members 36 and 38 respectively.

The teeth 30 are fixedly attached to shaft 46 to move the teeth horizontally in and out between the filtering elements of the filter member 22. The teeth include slots 230 that allows shaft 37 to pass through the teeth during the in and out movement.

FIG. 1 shows a cam groove 50 with an outward moving portion 51 in Phase III. The teeth may include upward projection nodules 70 with slope 72 and top 74 as shown in FIGS. 3, 4, 5 and 8. This projection 70 scrapes the sides of the adjacent filtering elements 9 of the filtering member 22 as the teeth 30 move outward and upward and as the teeth 30 move past the rearward sloping edge 23 and the vertical forward edges 32 of the filtering elements of the filtering member shown in FIGS. 1, 2, 3, 4, 5, and 6 and loosens any residual debris that would otherwise remain and adhere against the filter members. The edge 23 is a cut-out portion of the filtering elements of the filtering member. During inward movement in Phase IV, this debris drops off the teeth and may be aided by the movement of the debris removing mechanism 24.

It should be noted that from Phase IV when the teeth move inwardly to drop all the debris from the tooth between phantom positions C and D, the teeth move downwardly to phantom position E prior to moving forward to the position shown by numeral 30 to begin the cycle agian. FIG. 1 therefore shows the cycle of operation of the teeth.

Referring now to FIG. 11 again showing teeth 30 in its lower most position, the drawing illustrates a second embodiment for the scraper 100 which is pivoted about a point 102. This scraper 100 provides a scraping action to the uppermost surface of the teeth as illustrated in FIG. 1 by member 24. Another embodiment of a slide is shown by numeral 104. The slide 104 pivots about member 106 to allow the debris and trash to fall down the slope to a position on platform 108 or a container not shown. This illustration shows separator means 110 and 112 that are slidable up and down with portion 110' and 112' between the filter elements of the filter member 22. The separator means 110 and 112 move up on top of the teeth as the teeth move through Phase II, III and IV as shown in FIG. 1. The separator means 110 and 112 and additional such members may be moved up on top of the teeth to a position in the area shown by numeral 114 as the teeth move rearwardly before moving downwardly during Phase V. After the teeth move to their innermost position and then begin to move downwardly during Phase V, the teeth carry the spacers 110 and 112 downwardly with them in order to aid in reestablishing the spacing between the various filter elements 9 in the filter member 22. The lowermost position of 110 is fixed by the position of stop member 116 which allows the separator 110 to stay in Phase II even after the tooth continues to move downwardly, as shown in FIG. 11. Member 112 may be stopped by an additional stop member 118 so that this separator 112 may move down to stop member 118.

The lifting mechanism shown in FIGS. 11, 12 and 13 has additional means for raising and lowering the teeth assembly through a cable lift arrangement 200. The structure 202 and 204 shown in FIG. 12 and shown in detail in FIGS. 13 and 14 are utilized to prevent excessive vibration of the moving teeth, and to steady the moving teeth as they move up and down from the lowermost position to the uppermost position. The teeth are connected to structural channel members 120 and 121 by plate 216 connected to shaft 37, and plate 216 connected to plates 214, 212, 210 and 210'. Plate 210 is connected to member 120. Plate 210' is connected to 221. Channel members 120 and 121 move up and down about C-shaped fixed members 122 and 123.

The adjusting nuts 124 and 125 may be used to move nylon bushing into engagement with members 122 and 123. The bushing prevent lateral movement left or right at the rear of the mechanism. This member is moved up and down by cable 200. The arm 132 may be connected to member 130 that is positioned in the center of C-shaped channel 122 to prevent chatter.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A lift filter system partially positioned below the surface of the fluid to filter fluid and to lift debris out of the fluid, comprising:
   a filtering member including a plurality of closely spaced parallel filtering elements, said filtering elements having an upstream face, said filtering member positioned across the fluid stream and from a lowermost position below the stream surface to an upper position above the stream surface;
   said filtering member generally positioned in a generally vertical plane;
   a debris lift mechanism mainly positioned downstream of said filtering members, said lifting mechanism including a plurality of teeth means for removing and lifting debris from said filtering member by vertical movement continuously between said filtering elements, said teeth means having distal ends;
   a drive means connected to said teeth means for cyclic lifting and lowering said teeth means,
   a control means connected to said teeth means for providing a cyclic path of vertical movement for said teeth means, said control means having an upward lifting cycle portion and a downward return cycle portion, said control means continuously maintaining said distal ends of said teeth means continuously between said filtering elements during the entire cyclic movement including the entire said upward lifting cycle portion and said downward return cycle portion thereby eliminating periodic removal and reentry of said teeth means between said filtering elements;
   said control means for positioning the distal ends of said teeth means upstream of said filtering elements during the upward lifting cycle portion of movement and for positioning of the distal ends of said teeth means at or rearward of said upstream face of said filtering elements during the downward return cycle portion of movement; and
   said control means including a filter element cleaning means and a teeth cleaning means, said filter element cleaning means for automatically cleaning said filtering elements and said teeth cleaning means for automatically cleaning said teeth means during controlled movement of said teeth means relative to said filtering elements.

2. A lift filter system as set forth in claim 1, including:
   a movable teeth engaging cleaning means positioned to engage said teeth to scrape off debris as said teeth means move upward adjacent the top of the upward lifting cycle portion of movement.

3. A lift filter system as set forth in claim 1, wherein:
   said control means for first positioning the distal ends of said teeth upstream of said filtering elements at an intermediate upstream position below the surface of the fluid;
   said filter element teeth cleaning means for positioning the distal ends of said teeth means at a second position further upstream of said filtering elements above the surface of the fluid.

4. A lift filter system as set forth in claim 3, including:
   said filter elements upstream face is indented adjacent the top of the upward lifting cycle portion of movement to aid in cleaning said filtering elements.

5. A lift filter system partially positioned below the surface of the fluid to filter fluid and to lift debris out of the fluid, comprising:
   one filtering member including a plurality of closely spaced filtering elements, said filtering elements having an upstream face, said filtering member positioned across the fluid stream and from a lowermost position below the stream surface to an upper position above the stream surface;
   said filtering member generally positioned in a generally vertical plane;
   a debris lift mechanism mainly positioned downstream of said filtering members, said lifting mechanism including a plurality of teeth means for movement between said filtering elements, said teeth means having distal ends;
   a drive means connected to said teeth means, and
   control means connected to said teeth means for providing a cyclic path of movement of said teeth means, said control means having an upward lifting cycle portion and a downward return cycle portion, said control means continuously maintaining at least one position of said teeth means between said filtering elements;
   said control means for positioning the distal ends of said teeth means upstream of said filtering elements during the upward lifting cycle portion of movement and for positioning of the distal ends of said teeth means at or rearward of said upstream face of said filtering elements during the downward return cycle portion of movement;
   said control means including a filter element teeth cleaning means for automatically cleaning said filtering elements and said teeth means during the controlled movement of said teeth relative to said filtering elements;
   said control means for first positioning the distal ends of said teeth means upstream of said filtering elements at an intermediate upstream position below the surface of the fluid;
   said filter element teeth cleaning means for positioning the distal ends of said teeth means at a second position further upstream of said filtering elements above the surface of the fluid, and
   said teeth means each having a raised top face portion positioned downstream of said upstream face of said filtering elements when said teeth means are in said intermediate upstream position, said teeth means positioned to move said raised top face portion forward of said upstream portion of said filtering elements during the outward movement of said teeth means to said second position;
   whereby said teeth means aid in cleaning said filtering elements.

6. A lift filter system partially positioned below the surface of the fluid to filter fluid and to lift debris out of the fluid, comprising:
   one filtering member including a plurality of closely spaced filtering elements, said filtering elements having an upstream face, said filtering member positioned across the fluid stream and from a lowermost position below the stream surface to an upper position above the stream surface;
   said filtering member generally positioned in a generally vertical plane;
   a debris lift mechanism mainly positioned downstream of said filtering members, said lifting mechanism including a plurality of teeth means for movement between said filtering elements, said teeth means having distal ends;
   a drive means connected to said teeth means, and control means connected to said teeth for providing a cyclic path of a movement of said teeth means, said control means having an upward lifting cycle portion and a downward return cycle portion, said control means continuously maintaining at least one position of said teeth means between said filtering elements;

said control means for positioning the distal ends of said teeth means upstream of said filtering elements during the upward lifting cycle portion of movement and for positioning of the distal ends of said teeth means at or rearward of said upstream face of said filtering elements during the downward return cycle portion of movement;

said control means including a filter element teeth cleaning means for automatically cleaning said filtering elements and said teeth means during the controlled movement of said teeth means relative to said filtering elements; and movable spacer means positioned between said filtering elements and movable upward and downward by engagement with the top said teeth means.

* * * * *